United States Patent
Holubar

(10) Patent No.: US 12,352,616 B1
(45) Date of Patent: Jul. 8, 2025

(54) RETRACTABLE SCALE SYSTEM WITH DEPLOYMENT MECHANISM

(71) Applicant: Robert Holubar, Timnath, CO (US)

(72) Inventor: Robert Holubar, Timnath, CO (US)

( * ) Notice: Subject to any disclaimer, the term of this patent is extended or adjusted under 35 U.S.C. 154(b) by 0 days.

(21) Appl. No.: 19/044,044

(22) Filed: Feb. 3, 2025

(51) Int. Cl.
| | |
|---|---|
| G01G 21/22 | (2006.01) |
| A47K 17/00 | (2006.01) |
| F16M 11/04 | (2006.01) |
| F16M 13/02 | (2006.01) |
| G01G 19/44 | (2006.01) |
| G01G 21/28 | (2006.01) |
| G01G 23/00 | (2006.01) |
| G01G 23/01 | (2006.01) |

(52) U.S. Cl.
CPC .............. *G01G 21/28* (2013.01); *G01G 21/22* (2013.01); *G01G 23/00* (2013.01); *G01G 23/01* (2013.01); *A47K 2201/00* (2013.01); *F16M 11/04* (2013.01); *F16M 13/022* (2013.01); *G01G 19/44* (2013.01)

(58) Field of Classification Search
CPC ........ G01G 21/22; G01G 21/28; G01G 23/01; G01G 23/00; G01G 19/44; A47K 2201/00; F16M 11/04; F16M 13/022
USPC ....................................... 177/126–127, 25.19
See application file for complete search history.

(56) References Cited

U.S. PATENT DOCUMENTS

| | | | | | |
|---|---|---|---|---|---|
| 1,887,986 | A | * | 11/1932 | Baldwin ............... | G01G 23/00 177/126 |
| 2,181,272 | A | * | 11/1939 | Greenleaf ............. | G01G 19/44 177/126 |
| 2,441,037 | A | * | 5/1948 | Sherrin ................. | G01G 19/44 177/144 |
| 2,872,178 | A | * | 2/1959 | Holland ................ | G01G 19/44 177/127 |
| 2,924,443 | A | * | 2/1960 | Townsend ............ | G01G 19/44 177/126 |
| 3,097,712 | A | * | 7/1963 | Johnson ................ | G01G 19/44 177/144 |
| 3,243,002 | A | * | 3/1966 | Reibold ................ | G01G 19/44 177/180 |
| 3,721,800 | A | * | 3/1973 | Eisler ................... | H05B 3/26 392/435 |
| 4,288,131 | A | * | 9/1981 | Griffin .................. | G01G 19/44 5/147 |
| 4,351,505 | A | * | 9/1982 | Wickersham ........ | F16M 11/041 177/264 |
| 4,576,244 | A | * | 3/1986 | Zeigner ................ | G01G 19/44 177/245 |
| 5,475,933 | A | * | 12/1995 | Ueda .................... | G01G 19/52 177/264 |

(Continued)

*Primary Examiner* — Randy W Gibson
(74) *Attorney, Agent, or Firm* — Colorado Venture Patents LLC

(57) ABSTRACT

A retractable weight scale mounts to a vertical surface and deploys for use or retracts for storage. The device comprises a mounting base, drive system for controlled movement, scale assembly for weight measurement, and integrated controls. Multiple weight detection systems and automated features provide accurate measurements while maximizing space usage and reducing tripping hazards. Safety features include obstruction detection and emergency stops. The scale retracts vertically against the mounting surface when not in use, preserving floor space while remaining accessible.

13 Claims, 11 Drawing Sheets

(56) References Cited

U.S. PATENT DOCUMENTS

| | | | | |
|---|---|---|---|---|
| 5,612,515 | A | * | 3/1997 | Eisen .................... G01G 19/445 |
| | | | | 177/127 |
| 6,441,323 | B1 | * | 8/2002 | Montagnino ........ G01G 21/283 |
| | | | | 177/127 |
| 6,590,166 | B2 | * | 7/2003 | Yoshida ................. A61B 5/742 |
| | | | | 177/245 |
| 6,781,067 | B2 | * | 8/2004 | Montagnino ...... G01G 23/3728 |
| | | | | 177/173 |
| 6,864,436 | B1 | * | 3/2005 | Nobes ................ G01G 23/3728 |
| | | | | 177/126 |
| 7,741,569 | B2 | * | 6/2010 | Lin ........................ G01G 21/22 |
| | | | | 177/126 |
| 8,859,914 | B1 | * | 10/2014 | Huang ................... G01G 21/28 |
| | | | | 177/126 |
| 2009/0178858 | A1 | * | 7/2009 | Daniels .............. G01G 19/4146 |
| | | | | 177/25.19 |
| 2009/0267786 | A1 | * | 10/2009 | Sakamaki ............... E05F 15/44 |
| | | | | 49/360 |

* cited by examiner

RETRACTABLE SCALE SYSTEM WITH DEPLOYMENT MECHANISM

BACKGROUND OF THE INVENTION

Floor-use weight measurement scales are commonly used across various facilities including residential homes, hospitals, doctors' offices, nursing homes, locker rooms, manufacturing facilities, and package shipping departments where weight monitoring is essential. Similarly, countertop scales for weighing items like food ingredients, meal portions, medicines, chemicals, and packages are prevalent in residential homes, commercial kitchens, and laboratories.

However, conventional weight measurement devices present several challenges in their usage and storage. A primary concern is the inefficient use of valuable floor or counter space, as these scales permanently occupy surface area even when not in use. This space utilization issue is particularly problematic in facilities where surface area is limited and needed for other purposes.

The presence of floor scales also creates potential safety hazards, as they can become obstacles over which people may trip or fall. This safety concern is especially significant in healthcare settings and high-traffic areas where mobility-impaired individuals may be present.

Additionally, the permanent placement of conventional scales complicates routine cleaning and sanitization procedures. When floor or counter surfaces need to be cleaned, scales must be temporarily relocated, requiring alternative storage locations and creating inefficiencies in maintenance protocols.

In environments like commercial kitchens and laboratories where counter space is limited and prone to clutter from other materials, traditional countertop scales present particular challenges for space management and workflow efficiency. The need to constantly relocate these devices for temporary storage during surface cleaning or when the space is needed for other purposes creates operational inefficiencies and potential safety risks.

These challenges highlight the need for an improved weight measurement solution that addresses space utilization, safety concerns, and maintenance accessibility while maintaining the functionality and accuracy of conventional scales.

SUMMARY OF THE INVENTION

A retractable weight measurement device is provided that can be mounted to a vertical surface and deployed when needed for operation, then retracted for convenient and safe storage. The device comprises a mounting base secured to a vertical surface, a drive system for controlled deployment and retraction, a scale assembly for weight measurement, and integrated electrical components for operation and control.

The mounting base provides stable attachment to walls or vertical surfaces while supporting the full weight of the scale in both deployed and retracted positions. Multiple mounting configurations accommodate standard and non-standard wall stud spacing.

The drive system enables controlled translation between stowed and deployed positions through various mechanisms including cable and winch systems, chain drives, hydraulic actuators, linear actuators, direct drive motors, worm gears, or manual operation systems. Safety features prevent uncontrolled movement and protect against obstructions.

The scale assembly includes a platform for weight measurement, structural subframe, and weight sensing components that maintain accuracy in both vertical and horizontal orientations. Multiple weight detection systems are available including load cells, pressure transducers, and capacitive sensors.

Integrated electrical components provide automated control through proximity sensing, scheduled operation, and user interfaces including touch screens, physical controls, and remote operation capability. The system includes comprehensive safety features such as obstruction detection, emergency stops, and free-motion capability during power loss.

The invention solves space utilization challenges by enabling vertical storage when not in use, improves safety by eliminating tripping hazards, and facilitates cleaning and maintenance through its retractable design. Advanced control and communication features enable integration with facility management systems while maintaining accurate weight measurement capabilities.

DETAILED DESCRIPTION

In a preferred embodiment of the invention, a retractable weighing scale system 100 is provided that addresses the challenges of space utilization, safety concerns, and maintenance accessibility while maintaining accurate weight measurement capabilities. The preferred embodiment comprises a mounting base 110 attached to a vertical surface, a drive system for controlled deployment and retraction, a scale assembly for weight measurement, and integrated electrical components for operation and control.

In an embodiment of the invention, the mounting base 110 provides a stable foundation for the scale system 100, allowing it to be securely attached to walls or other vertical surfaces while supporting the full weight of the scale in both deployed and retracted positions. This mounting solution eliminates the permanent occupation of valuable floor or counter space when the scale system 100 is not in use, directly addressing space utilization concerns in various facilities.

Figure 1:
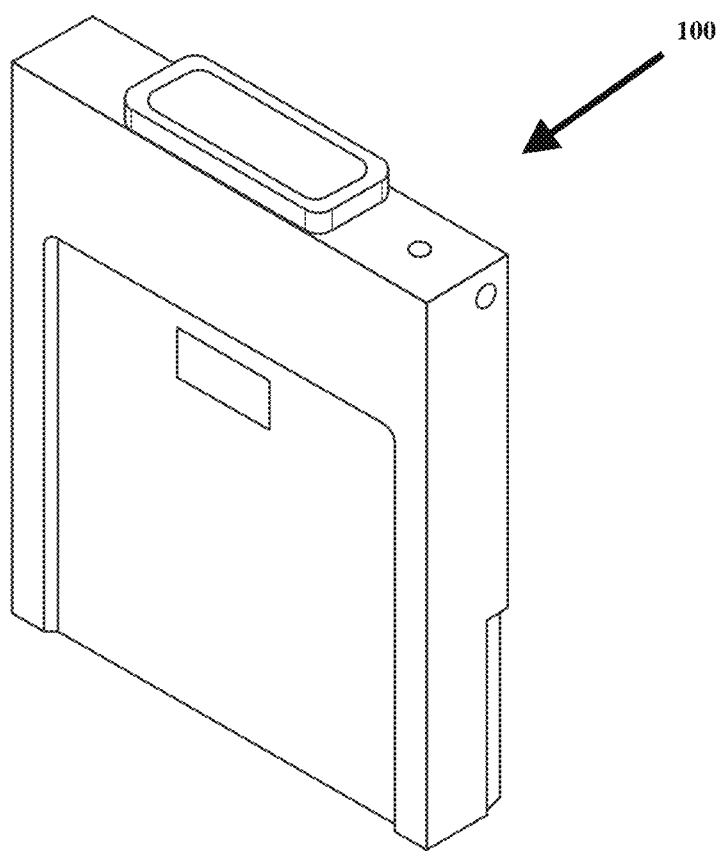
FIG. 1 illustrates a perspective view of a vertical slide deployment configuration of a retractable scale system in an embodiment, showing the mounting base as may be attached to a vertical surface and the scale assembly in its retracted position.
Figure 2:
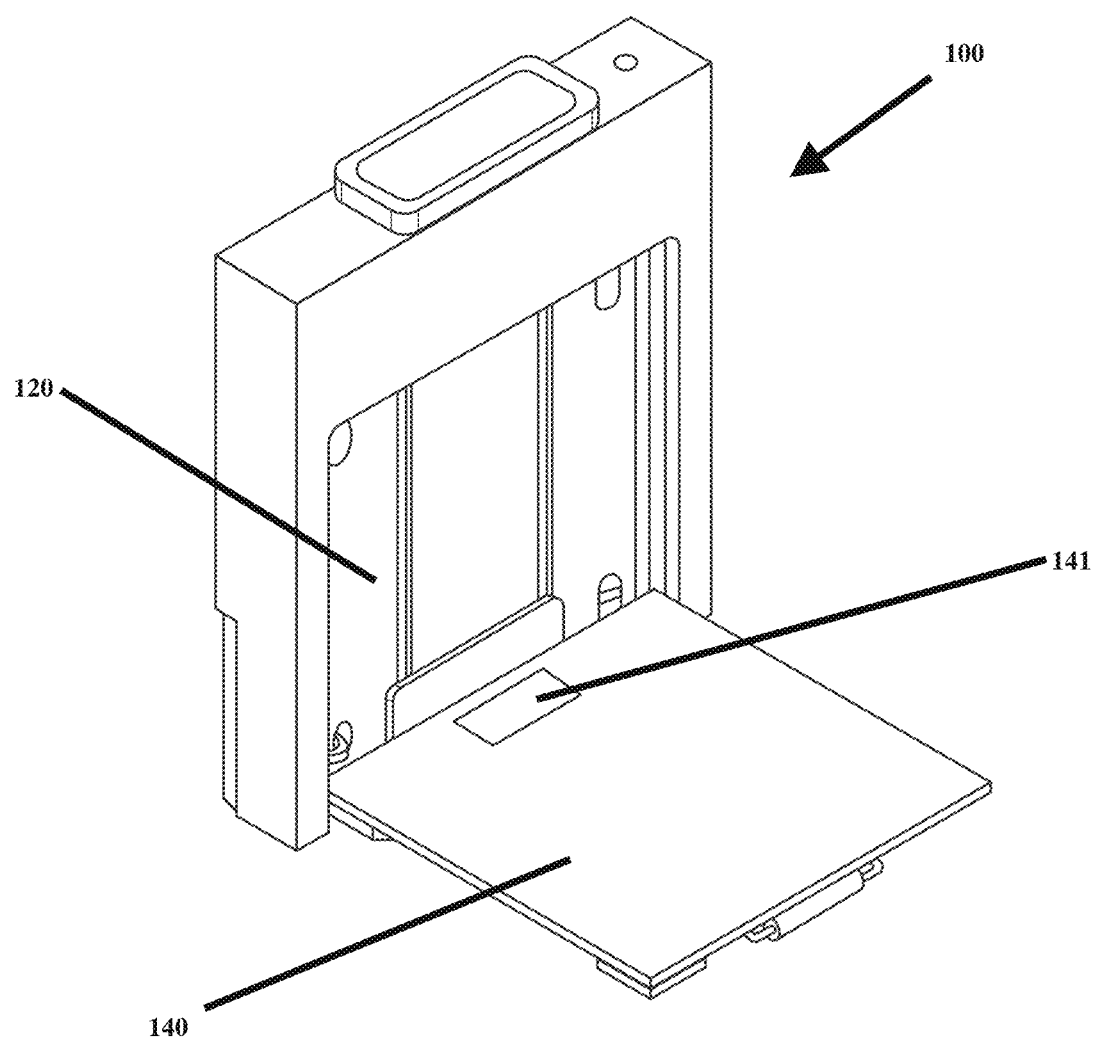
FIG. 2 illustrates a perspective view of a multi-panel deployment configuration of the retractable scale system in ab embodiment, showing the mounting base as may be attached to a vertical surface and the scale assembly in its deployed position.
Figure 3A:
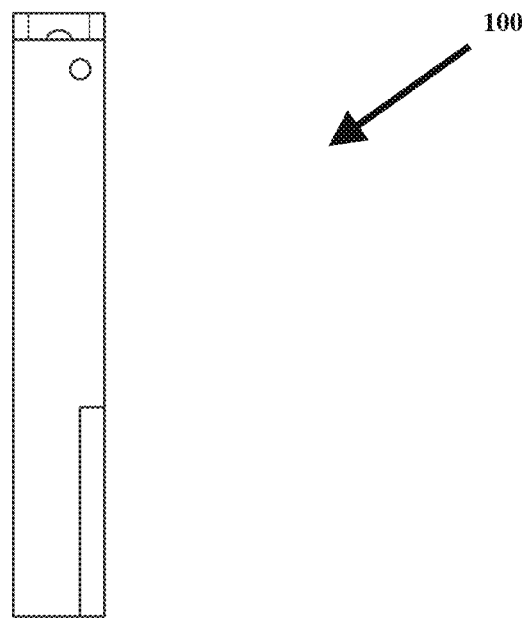
FIG. 3a illustrates a side view of a vertical slide deployment configuration of a retractable scale system in an embodiment, showing the mounting base as may be attached to a vertical surface and the scale assembly in its retracted position.

In another embodiment of the invention, safety hazards associated with conventional floor scales are mitigated through the scale system's 100 ability to retract to a vertical position, for example as depicted in FIG. 3*a*, when not in use, removing potential tripping obstacles from walkways and work areas. The embodiment incorporates multiple safety features including obstruction detection systems, emergency stop functionality, and a free-motion mode for power outages, ensuring safe operation in all environments.

Figure 3B:
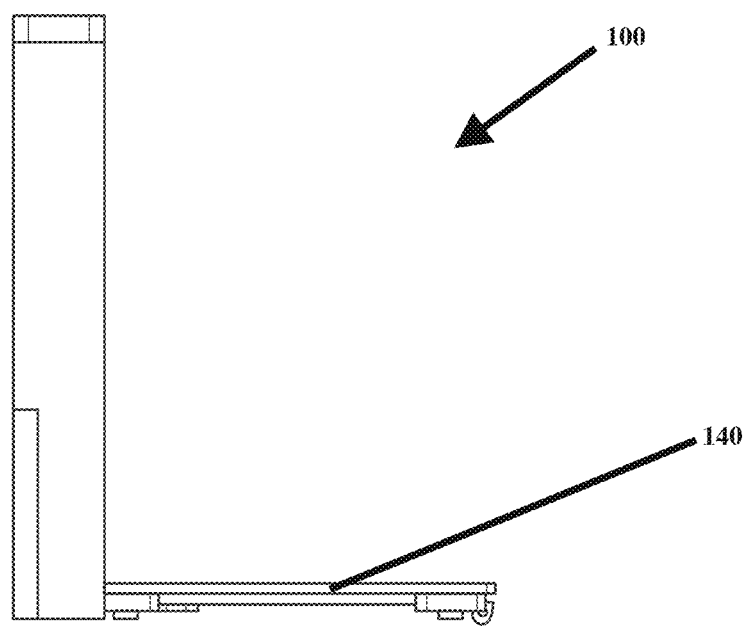
FIG. 3b illustrates a side view of a vertical slide deployment configuration of a retractable scale system in an embodiment, showing the mounting base as may be attached to a vertical surface and the scale assembly in its deployed position.
Figure 4:
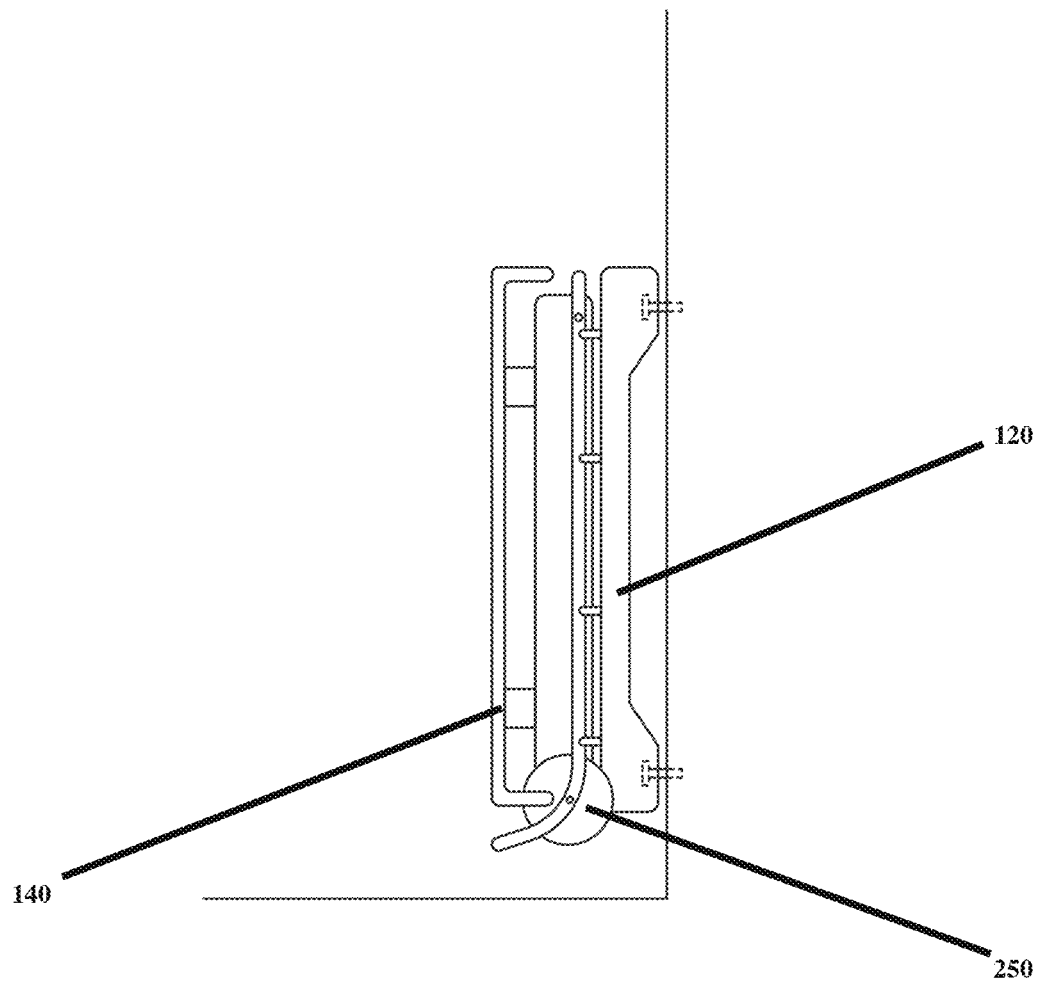
FIG. 4 illustrates a side view of a vertical slide deployment configuration of the components of a retractable scale system in an embodiment, showing the components mounting base as may be attached to a vertical surface and the scale assembly in its retracted position.
Figure 5:
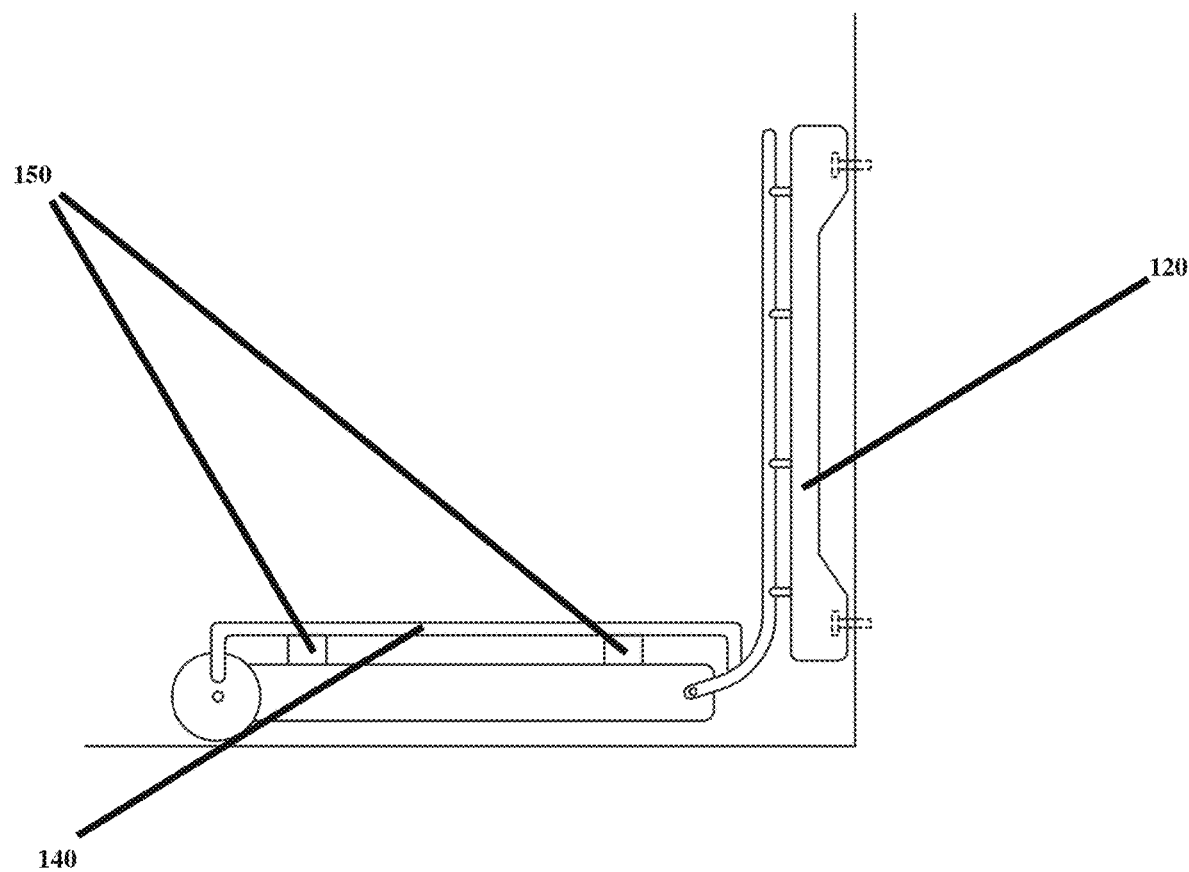
FIG. 5 illustrates a side view of a vertical slide deployment configuration of the components of a retractable scale system in an embodiment, showing the components mounting base as may be attached to a vertical surface and the scale assembly in its deployed position.
Figure 6:
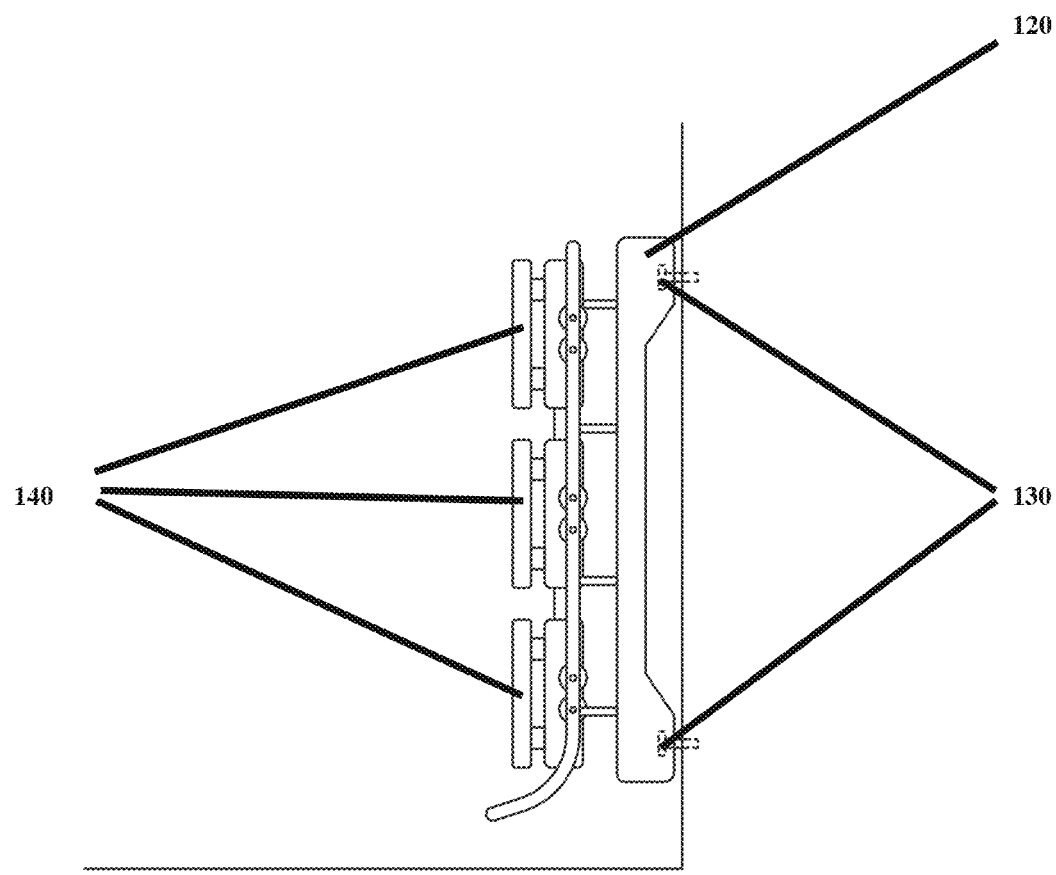
FIG. 6 illustrates a side view of a vertical slide deployment configuration of the components of a retractable scale system in an alternative embodiment, showing the components mounting base as may be attached to a vertical surface and the scale assembly in its retracted position, comprising the platform, subframe, weight sensing components, and support elements.
Figure 7:
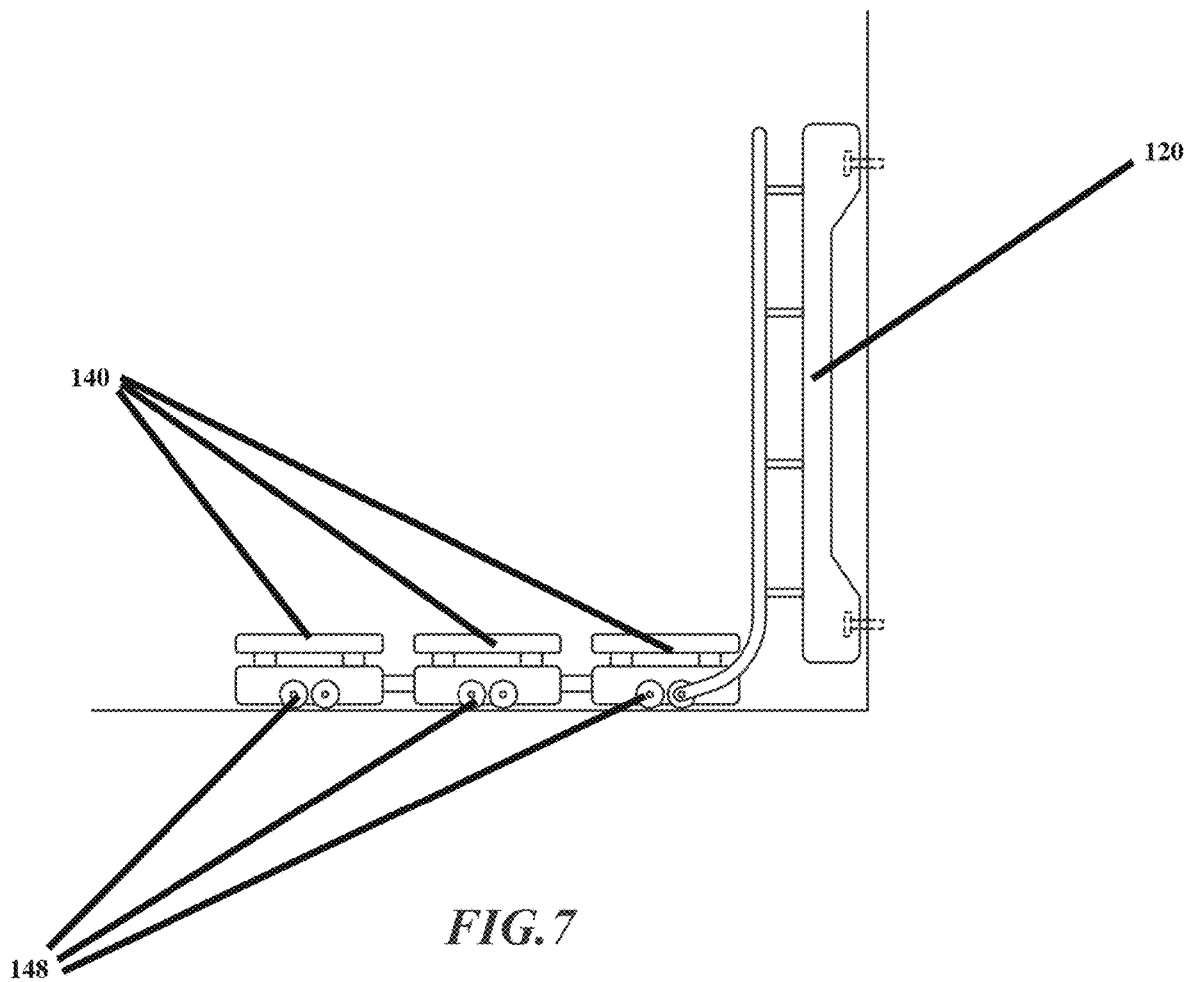
FIG. 7 illustrates a side view of a vertical slide deployment configuration of the components of a retractable scale system in an alternative embodiment, showing the components mounting base as may be attached to a vertical surface and the scale assembly in its deployed position, comprising the platform, subframe, weight sensing components, and support elements.

The preferred embodiment's retractable design facilitates thorough cleaning and sanitization of surfaces by allowing complete access to the floor or counter area beneath the scale. When cleaning or maintenance is required, the scale system 100 can be easily deployed, as depicted in FIG. 3*a* in an example, or retracted, as depicted in FIG. 3*b* in an example, without the need for temporary relocation or storage, improving operational efficiency in facilities where regular sanitization is essential.

In various embodiments of the invention, multiple deployment configurations and drive systems are offered to accommodate various installation requirements and use cases. Weight measurement accuracy is maintained through several available weight detection systems, while automated functions and multiple control options provide convenient operation. The scale can be programmed for automatic deployment based on proximity detection or scheduled times, enhancing accessibility while maintaining efficient space utilization.

In an example of the invention, remote monitoring capabilities and data collection features enable tracking of weight measurements over time and facilitate preventive maintenance, adding value beyond basic weight measurement functionality. The integration of modern control systems and safety features ensures reliable operation while protecting both users and the equipment from potential hazards.

Through these embodiments, the invention in an embodiment transforms the traditional weight scale from a static obstacle into a dynamic tool that maximizes space utilization, enhances safety, and improves facility maintenance efficiency while delivering accurate weight measurements.

In a preferred embodiment of the invention, the mounting base 110 comprises a rigid frame structure 120 designed for secure attachment to a vertical surface such as a wall, cabinet, or furniture. The frame 120 can be constructed from durable materials such as steel, aluminum, or high-strength polymers capable of supporting the full weight of the scale assembly in both deployed and retracted positions.

In another embodiment of the invention, the mounting base includes provisions for attachment using high-strength adhesive mounting tape, such as alien tape or similar advanced adhesive products. The mounting surface is prepared with appropriate cleaning and surface treatment protocols to ensure optimal adhesion. The adhesive mounting option can be used independently or in conjunction with traditional mounting hardware to provide additional mounting security.

When utilizing adhesive mounting, the mounting base incorporates specific surface texturing or preparation zones designed to maximize bonding strength with the adhesive tape. The mounting base's load distribution features ensure that forces are properly spread across the adhesive mounting areas to maintain secure attachment under both static and dynamic loading conditions. The adhesive mounting option provides a non-invasive installation method while maintaining the structural integrity required to support the full weight of the scale system in both deployed and retracted positions.

In a preferred embodiment, the adhesive mounting tape is applied in vertical strips along the mounting base's preconfigured attachment zones that align with the standard wall stud spacing patterns (16 inch or 24 inch on center) as described for the mounting holes. The mounting tape strips are positioned to distribute load forces across multiple attachment points in the same manner as the traditional mounting hardware, with additional strips placed at strategic reinforcement points where the drive system couples to the mounting base. The mounting base's rigid frame structure includes specifically textured surfaces at these attachment points to optimize the bonding interface between the frame and adhesive tape. When installing, the mounting tape is first applied to these prepared surfaces on the mounting base, then after removing the protective backing, the entire assembly is pressed firmly against the properly cleaned vertical surface to achieve maximum adhesion strength.

In an embodiment of the invention, the mounting base 110 includes strategically placed predrilled holes or slots 130 configured in an example to comprise multiple horizontal spacing options to accommodate installation into standard wall stud spacing (e.g., 16 inch or 24 inch on center) as well as non-standard stud configurations. These mounting points are designed to distribute the load forces across multiple attachment points for maximum stability and safety.

The preferred embodiment utilizes appropriate mounting hardware and fasteners provided with the scale system 100 for secure installation. The mounting hardware in an embodiment comprise lag bolts, heavy-duty wall anchors, or other suitable fasteners rated for the expected load capacity of the scale system. The mounting base 110 in an exemplary use remains permanently fixed to the vertical surface, providing a stable foundation for the scale system's 100 operation.

In another embodiment of the invention, the mounting base 110 incorporates reinforced attachment points for coupling other scale components such as the drive system 250 and scale assembly. These attachment points are engineered to handle both static and dynamic loads during scale system 100 deployment and retraction while maintaining rigid positioning against the wall surface.

The mounting base 110 in an embodiment comprises integrated channels, rails, or other guiding components that facilitate the controlled movement of the scale system 100 between retracted and deployed positions. In an example of the invention, these guiding components remain firmly attached to the mounting base 110, ensuring consistent and reliable operation of the deployment mechanism while maintaining the structural integrity of the scale system 100.

In a preferred embodiment of the invention, the drive system 250 comprises integrated mechanical and electrical components that enable controlled translation of the scale system 100 between stowed and deployed positions. The drive system 250 in accordance with exemplary embodiments can be implemented through several different configurations:

Cable and Winch System

In an embodiment of the invention, the drive system 250 utilizes a motorized winch assembly mounted to the rigid frame structure 120, with a high-strength cable made of braided steel or synthetic materials. The cable connects to the scale system 100 assembly, and the associated winch motor provides controlled deployment and retraction through cable spooling. Position sensors and limit switches monitor the cable tension and position to ensure proper operation.

Chain and Motor System

Another embodiment employs a chain drive mechanism with a fixed motor mounted to the rigid frame structure 120. The mechanism in accordance with various embodiments can use either a tethered configuration, where the chain end attaches directly to the scale system 100 assembly, or a continuous loop configuration where the chain forms a circuit around drive and deployment sprockets. The motor provides bi-directional control through a geared transmission system.

Hydraulic Actuator System

In an example of the invention, the drive utilizes hydraulic actuators comprising a master cylinder, subordinate cylinders, pressure source, and connecting hoses. The pressure source can be an electric pump or manual activation system. Pressure sensors and position switches coordinate the movement of multiple actuators when used. The cylinders mount between the rigid frame structure 120 and scale system 100 assembly to provide smooth deployment motion.

Linear Actuator System

A preferred embodiment implements electric linear actuators with integrated motor, drive gear, threaded rod, and actuator housing. The actuators mount between fixed points on the base frame and moving points on the scale system 100 assembly. Position feedback sensors within the actuators enable precise control of extension and retraction movements.

Direct Drive Motor System

In another embodiment, a high-torque stepper motor directly couples to the pivot point or hinge of the scale system 100 assembly through a drive shaft. This configuration provides accurate positional control through the motor's inherent step counting capability, with additional position sensors for verification.

Worm Gear System

An embodiment of the invention employs a worm gear drive with a vertically mounted threaded shaft, parallel guide shaft, and threaded nuts coupled to the scale system 100 assembly. A motor rotates the worm gear to raise or lower the assembly, while the guide shaft prevents rotation. Multiple threaded shafts can be used for additional stability.

In a preferred embodiment of the invention, the worm gear drive system comprises three primary mounting components that enable precise vertical translation of the scale assembly. A top motor mount serves multiple functions including securing the drive motor to the housing interior, anchoring guide shafts, and maintaining parallel alignment between the guide shafts and worm drive shaft. In a preferred embodiment of the invention, the top motor mount comprises a specialized component that serves multiple critical functions in the worm drive system. The mount is engineered to securely attach the drive motor to the upper interior of the housing while simultaneously anchoring the guide shafts and maintaining their parallel alignment with the worm drive shaft. The mount's geometry ensures precise positioning of all three shafts—the worm drive shaft and two guide shafts—maintaining their spatial relationships throughout operation. The motor mount's construction provides stable support for the drive motor while enabling efficient power transfer to the worm drive shaft.

The drive motor in a preferred embodiment comprises a high-torque electric motor specifically selected for reliable operation of the worm gear system. Suitable motor types include stepper motors with integrated encoders for precise position control and inherent holding torque when powered, brushless DC motors with planetary gearheads providing efficient operation and reduced maintenance requirements, AC synchronous motors with built-in reduction gearing for smooth, controlled movement, and servo motors with closed-loop feedback control enabling accurate position monitoring and adjustment.

The motor selection is optimized for the specific load requirements and duty cycles of the scale system. The motor mount's design accommodates various motor form factors while maintaining proper shaft alignment and providing adequate ventilation for motor cooling. The mounting interface includes vibration isolation features to minimize operational noise and mechanical wear. The motor's electrical connections are routed through dedicated channels in the mount to maintain proper wire management and protect against interference with mechanical components.

A lower bearing mount secures the worm drive shaft's lower end to the housing while providing an integrated bearing mount and maintaining guide shaft parallel alignment. The bearing mount ensures smooth rotation of the drive shaft while minimizing friction and wear. In a preferred embodiment of the invention, the lower bearing mount comprises a specialized component that secures and stabilizes the lower end of the worm drive shaft while maintaining proper alignment with the guide shafts. The lower bearing mount in an embodiment incorporates an integrated bearing housing precisely machined to accommodate the drive shaft bearing, ensuring smooth rotational movement while minimizing friction and mechanical wear. The mount's geometry is engineered to maintain the guide shafts in parallel alignment with the worm drive shaft, which is critical for proper operation of the scale system. The lower bearing mount securely attaches to the lower interior wall of the housing, providing a stable foundation for the drive system. The lower bearing mount's construction in accordance with an exemplary embodiment enables precise positioning of both the drive shaft bearing and guide shafts, ensuring consistent alignment throughout repeated deployment cycles. The lower bearing mount's integrated design in accordance with an exemplary embodiment optimizes load distribution while maintaining the precise spatial relationships between the drive shaft and guide shafts necessary for reliable operation of the scale system.

Between these fixed points, a scale adapter mount provides the mechanical interface between the scale assembly and drive system. This adapter comprises a threaded center bore that meshes with the worm drive shaft threads and includes guide shaft pass-through holes. As the worm drive shaft rotates, the adapter's threaded engagement causes vertical translation while the guide shafts prevent rotation and provide lateral stability. In a preferred embodiment of the invention, the scale adapter mount comprises a specialized component that provides a mechanical interface between the scale assembly and the worm drive system. The adapter mount includes a precisely machined threaded center bore designed to mesh with the worm drive shaft threads, enabling controlled vertical translation as the shaft rotates. The adapter mount's geometry incorporates guide shaft pass-through holes positioned parallel to the center bore, which allow the mount to slide along the guide shafts while preventing rotational movement of the scale assembly. This configuration ensures the scale maintains proper orientation throughout its range of motion. The adapter mount's construction provides a secure, rigid connection between the scale platform and drive system while enabling smooth translation along the guide shafts. The mount's threaded engagement with the worm drive shaft ensures consistent, positive movement in both upward and downward directions, while its interface with the guide shafts provides the lateral stability necessary for reliable operation. The adapter mount's design optimizes load distribution between the drive shaft and guide shafts, preventing binding or misalignment during deployment cycles while maintaining precise positioning of the scale assembly relative to the mounting base. The scale adapter mount in accordance with an exemplary embodiment comprises a specialized component that provides a mechanical interface between the scale assembly and the worm drive system. The adapter mount includes a precisely machined threaded center bore designed to mesh with the worm drive shaft threads, enabling controlled vertical translation as the shaft rotates. The adapter mount's geometry incorporates guide shaft pass-through holes positioned parallel to the center bore, which allow the mount to slide along the guide shafts while preventing rotational movement of the scale assembly. This configuration ensures the scale maintains proper orientation throughout its range of motion. The adapter mount's construction provides a secure, rigid connection between the scale platform and drive system while enabling smooth translation along the guide shafts. The mount's threaded engagement with the worm drive shaft ensures consistent, positive movement in both upward and downward directions, while its interface with the guide shafts provides the lateral stability necessary for reliable operation. The adapter mount's design optimizes load distribution between the drive shaft and guide shafts, preventing binding or misalignment during deployment cycles while maintaining precise positioning of the scale assembly relative to the mounting base.

The guide shafts in an embodiment are positioned parallel to the worm drive shaft and slide through the adapter mount's pass-through holes, constraining the scale assembly's motion to pure vertical translation during deployment and retraction. This three-shaft arrangement ensures smooth, controlled movement while preventing binding or misalignment.

The motor mount, bearing mount, and scale adapter mount are specifically engineered for this application to maintain precise alignment and smooth operation throughout the scale system's range of motion. The mounting components' geometry and mechanical interfaces are optimized to provide stable support while enabling reliable deployment cycles.

Manual Operation System

In an example of the invention, the drive system incorporates manual control elements such as a lever, handwheel, or foot press mechanism. Force dampening components like stop bumpers, elastic couplers, or clutch plates protect against excessive user force input. The manual controls in an exemplary embodiment are positioned for ergonomic operation through vertical risers or remote mounting.

In a preferred embodiment of the invention, the scale system 100 assembly comprises several integrated components designed to provide accurate weight measurement while enabling reliable retraction and deployment:

Scale Platform

The preferred embodiment includes a scale platform 140 constructed of durable, lightweight materials such as aluminum or reinforced polymers. The scale platform 140 surface is sized appropriately for the intended use, whether for personal weight measurement or object weighing.

In an embodiment of the invention, the scale platform 140 incorporates structural reinforcement to prevent flexing while maintaining minimal weight.

Heated Surface

In an embodiment of the invention, the scale platform 140 comprises an integrated heating element, such as an electrical heating tape or similar resistive heating component, embedded within or attached to the underside of the platform surface. The heating element is configured to warm the scale platform 140 surface to a comfortable temperature when the scale platform 140 is deployed. The heating system in an exemplary embodiment is powered through the same electrical connections that supply the scale system's 100 other electrical components.

Platform Subframe

In an example of the invention, the platform subframe 145 provides structural support for the scale platform 140 and houses the weight sensing components. The platform subframe 145 is engineered to transfer loads from the platform to the weight sensing components while maintaining proper alignment during deployment and retraction. The platform subframe 145 in an exemplary embodiment includes dowel pins or similar locating components to properly position the scale platform 140 when deployed.

Weight Sensing Components

A preferred embodiment utilizes weight sensing components 150 positioned between the scale platform 140 and platform subframe 145. These weight sensing components 150 in various embodiments optionally comprise load cells, pressure sensors, or other force measurement devices calibrated for accurate weight detection. In an embodiment of the invention, the weight sensing components 150 are designed to maintain accuracy even after extended periods in the vertical storage position, as depicted by FIG. 3*a* in an example. When deployed, these weight sensing components 150 serve as primary load-bearing connection points between the scale platform 140 and platform subframe 145.

In a preferred embodiment, the heating element is automatically activated when deployment is initiated, allowing sufficient time for the platform surface to reach a comfortable temperature before user contact. Temperature sensors monitor the surface temperature to maintain it within a predetermined comfort range. The control system manages the heating element's operation, including automatic deactivation during retraction or after periods of non-use to conserve energy.

Traction Pads/Surface Texturing

In an example of the invention, the scale platform 140 comprises non-slip surface treatments to ensure safe operation. This optionally comprise molded texture patterns, applied grip tape, or removable traction pads strategically placed on the weighing surface. The surface treatments in an embodiment are designed to maintain effectiveness through repeated cleaning while providing sufficient friction for safe use.

In an embodiment of the invention, the scale platform is configured to accommodate removable decorative covers made of materials such as Lycra, cotton, or other suitable fabrics. The covers are designed to fit securely over the scale platform surface while maintaining full functionality of the weight sensing components and traction features. The covers can be easily attached and removed for cleaning, replacement, or style customization. The preferred embodiment includes a cover attachment system that ensures the decorative covers remain securely in place during scale operation while allowing for easy removal. The attachment system is designed to maintain proper contact between the user's feet and the weight sensing components through the cover material. The covers can feature various designs, patterns, and materials to match facility décor or user preferences while maintaining compliance with safety and cleaning requirements.

Support Feet/Rollers

The preferred embodiment includes adjustable support feet 147 or rollers 148 mounted to the platform subframe 145 to provide stable contact with the floor or counter surface when deployed. In an embodiment of the invention, these components can be height-adjustable to accommodate uneven surfaces and ensure proper load distribution. To facilitate the transition of the scale system 100 between positions, the adjustable support feet 147 or rollers 148 in an exemplary embodiment comprise low-friction materials or bearings to facilitate smooth movement while protecting the contact surface from wear.

In a preferred embodiment of the invention, the scale system 100 comprises electrical components incorporated within provide control, sensing, and user interface functionality:

In an embodiment of the invention, the scale system's electrical components are powered by rechargeable batteries housed within a sealed compartment in the mounting base or scale platform. The battery system provides portable power for all scale functions including the drive system, weight sensing components, control systems, and display elements. The battery compartment is designed for easy access to facilitate battery replacement or recharging while maintaining the system's structural integrity and cleanability.

In a preferred embodiment, the battery power system includes charge level monitoring, low battery alerts, and power management features integrated with the control system. The system automatically enters power-saving modes during periods of inactivity to extend battery life. Battery status information is displayed through the user interface, with alerts provided when charging or replacement is needed.

Audio Output System

In an embodiment of the invention, the scale system comprises an audio output system including speakers, voice synthesis capabilities, and personalization features integrated with the control system. The audio system is configured to provide customized voice greetings to users based on time of day and user identification. The speakers are weatherproofed and positioned within the scale platform or mounting base to provide clear audio output while maintaining the system's cleanability.

Central Processing Unit (CPU)

The preferred embodiment comprises a CPU and associated memory housed in a dedicated container mounted to the base frame or scale assembly. In an example of the invention, the CPU receives and processes signals from weight sensing components, controls automated functions, and manages data storage. The processor in an exemplary embodiment stores weight measurements over time, track maintenance needs, and enable communication with external devices or networks.

Control Elements

In an embodiment of the invention, control elements include touch-sensitive panels, physical buttons, switches, and foot-operated sensors. These elements in an exemplary embodiment are integrated into a central control panel or distributed across the device for optimal accessibility. The preferred embodiment comprises an emergency halt button prominently positioned for quick access, along with controls for deployment, retraction, and weight measurement functions.

Proximity Sensors

A preferred embodiment utilizes infrared, ultrasonic, or sonar detection devices to monitor the area around the scale system 100. These sensors detect potential obstructions in the scale's path of motion and prevent deployment or retraction when obstacles are present. In an example of the invention, multiple sensors provide overlapping detection zones for comprehensive coverage.

Position Sensors

In an embodiment of the invention, position sensors monitor the scale system's 100 configuration location throughout its range of motion. In various embodiments, these comprise limit switches, encoders, or other position feedback devices that communicate with the CPU to ensure proper deployment and retraction. The sensors also verify the scale system 100 has reached its fully deployed or stowed position.

Display Systems

The preferred embodiment comprises one or more digital display panels 141 showing weight measurements, system status, and user information. In an example of the invention, the display can be mounted in various positions for optimal visibility, including wall-mounted configurations or integration with the control panel. The display system in an exemplary embodiment is configured to display weight trends, maintenance alerts, and operational messages.

Lighting

In an embodiment of the invention, integrated lighting within the scale system 100 provides visual feedback about system status and illuminates the scale platform area. Status indicators can use different colors or patterns to communicate operational states, while task lighting improves visibility of the weighing surface. The lighting system can activate automatically based on proximity detection or user controls.

In a preferred embodiment of the invention, the scale system 100 comprises utilize several deployment designs:

Vertical Slide Deployment

Figure 8:
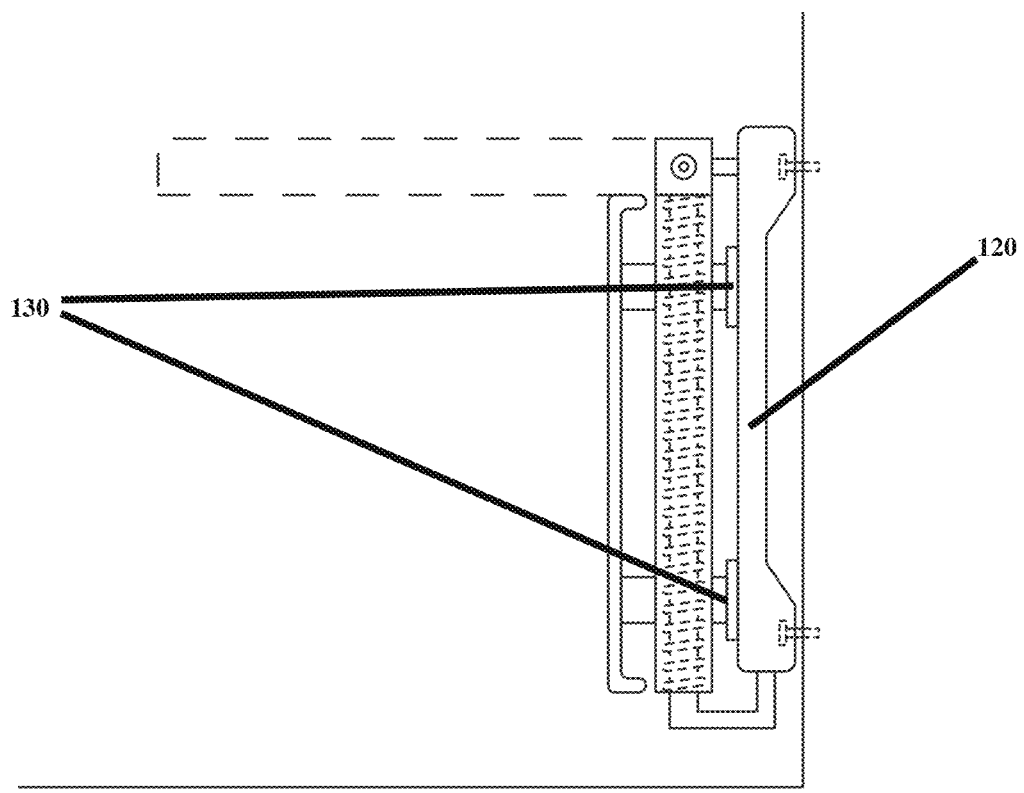
FIG. 8 depicts the deployment of the scale platform outward to a first stage position in accordance with an exemplary embodiment.
Figure 9:
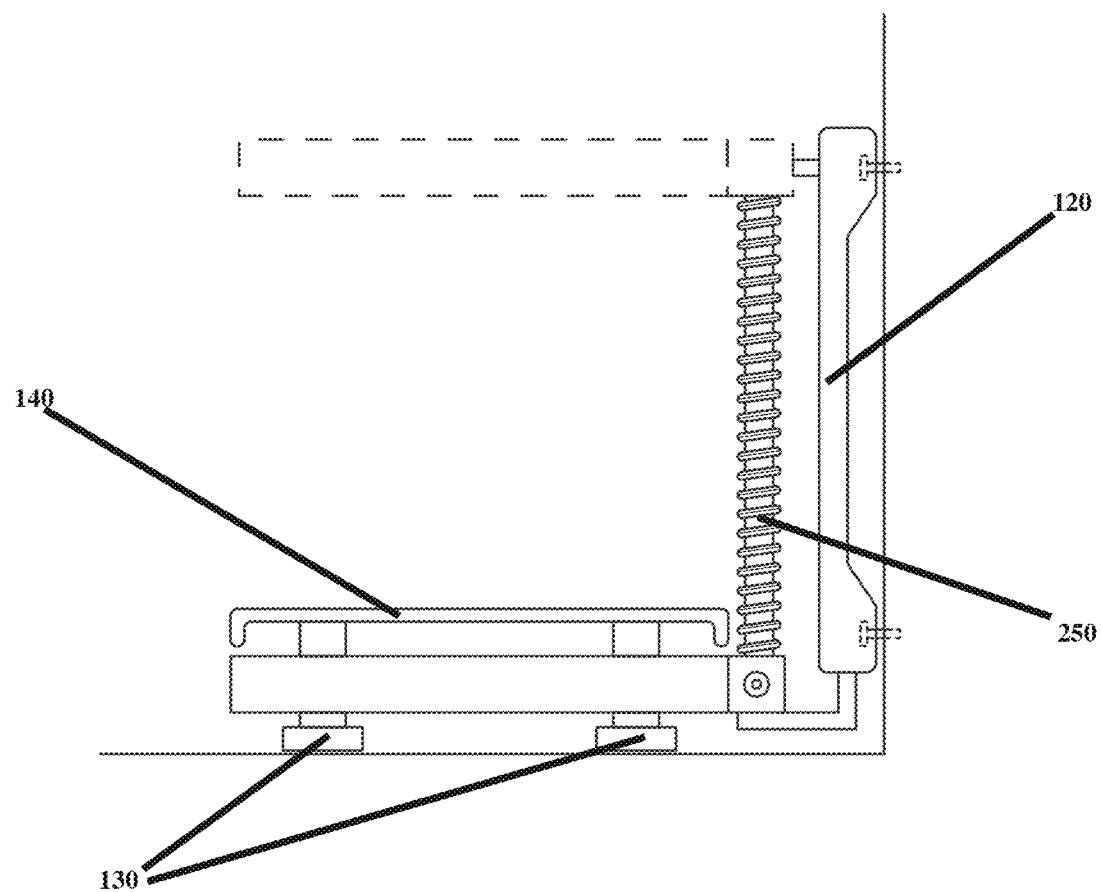
FIG. 9 depicts the deployment of the scale platform downward to a second stage position in accordance with an exemplary embodiment.
Figure 10:
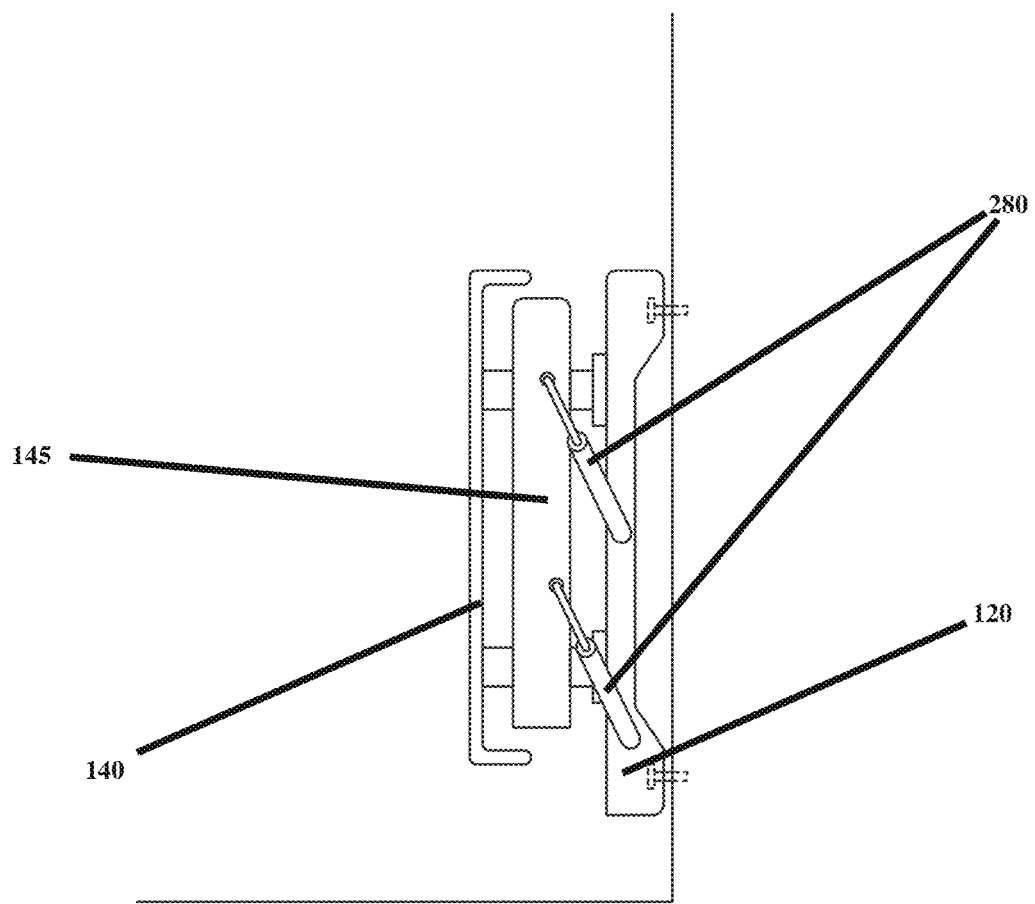
FIG. 10 depicts an embodiment of the scale system comprising multiple actuators to facilitate the deployment and stowage of the scale platform in accordance with intended methods of use depicted in its stowed position.

In an embodiment of the invention, the scale system 100 translates from a stowed position against the wall as depicted by FIG. 3*a* in an example to a deployed position as depicted by FIG. 3*b* in an example through a controlled sliding motion. The top end of the scale system 100 assembly in an embodiment is constrained by protrusions (pins, tabs, or rollers) that move within vertical guide rails mounted to the rigid frame structure 120. The lower end in an exemplary embodiment rotates outward to a position as depicted in a first stage by FIG. 8 and downward to a position as depicted in a second stage by FIG. 9 during deployment, guided by shaped rail ends or strut mechanisms. The preferred embodiment can make early floor contact to reduce cantilever forces, utilizing feet, rollers, or sliding surfaces for smooth transition.

Multi-Panel Deployment

In an example of the invention, the scale platform 140 and platform subframe 145 are divided horizontally into two or more hinged sections. The panels in such configuration rotate independently during deployment, similar to a sectional garage door system. Each panel includes lateral protrusions that travel in vertical guide rails mounted to the base frame. The preferred embodiment guides the panels away from the wall through shaped rail sections, with the panels making sequential contact with the floor surface using support feet or rollers.

Multi-Actuator Deployment

Figure 11:
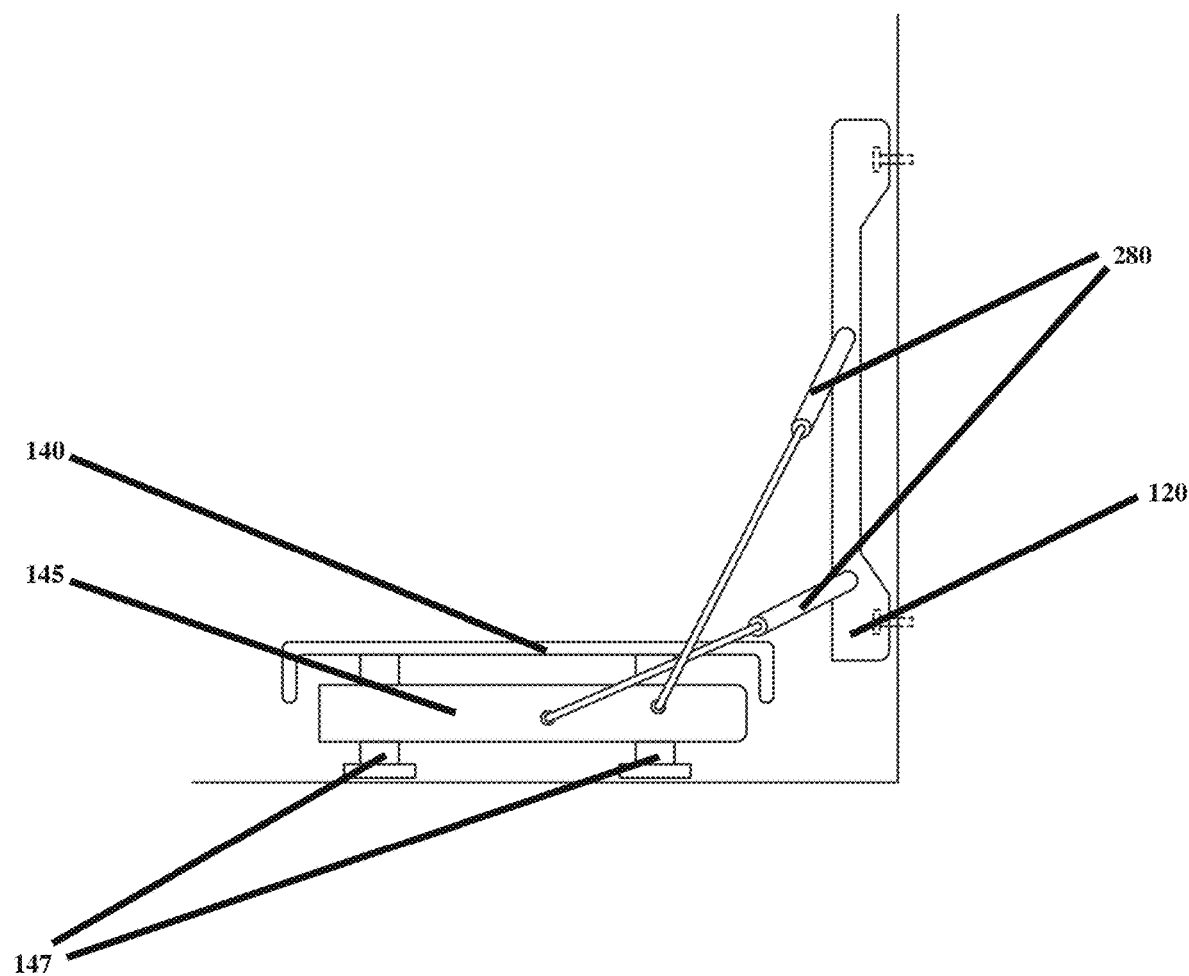
FIG. 11 depicts an embodiment of the scale system comprising multiple actuators to facilitate the deployment and stowage of the scale platform in accordance with intended methods of us depicted in its deployed position.

A preferred embodiment utilizes multiple actuators 160 as depicted in FIG. 11 working in coordination to control scale deployment. The multiple actuators 160 in an example comprising upper and lower actuator sets as depicted by FIG. 11 can be paired with struts to provide precise motion control. The lower actuator extends to push the bottom of the scale outward while the upper actuator initially retracts to pull the top downward. In an embodiment of the invention, the upper actuator reverses direction midway through deployment to guide the wall side of the scale assembly to the floor, eliminating the need for sliding contact during deployment.

Base Pivot Deployment

In an example of the invention, the scale system 100 assembly rotates about a lower pivot point mounted to the base frame. During deployment, the top of the scale rotates downward and outward while the lower end remains near the wall. The preferred embodiment includes load-bearing pivot hinges or support feet installed below the hinge point to handle user weight when deployed. The pivot mechanism provides simple, reliable operation with minimal moving parts.

Top Pivot Deployment

In an embodiment of the invention, the scale system 100 rotates about an upper pivot point while the lower end swings outward from the wall. The pivot point connects to a control mechanism like a screw gear or actuator to manage the lowering motion. The preferred embodiment includes support feet at the cantilevered end and can incorporate load-bearing components at the pivot point to properly distribute weight when deployed.

In a preferred embodiment of the invention, the scale system can utilize several weight detection systems:

Half Bridge Load Cells

In an embodiment of the invention, multiple half bridge load cells are positioned between the scale platform and subframe. The load cells are calibrated to measure cell deflection caused by applied weight on the platform. The preferred embodiment processes these measurements electronically through the CPU to determine accurate weight values. The load cells maintain calibration accuracy even after extended periods in vertical storage.

Liquid Pressure Transducer

In an example of the invention, one or more liquid-filled reservoirs or bladders are installed beneath the scale platform 140. When weight is applied, the internal pressure increases proportionally. A pressure transducer monitors the reservoir pressure and converts it to weight measurements. The preferred embodiment comprises multiple interconnected or isolated sub-reservoirs for distributed load measurement.

Capacitive Pressure Sensor

In an embodiment of the invention, capacitive sensors measure weight by detecting changes in capacitance between conductive plates separated by a deformable insulator or diaphragm. Applied weight causes the insulator to deform, changing the plate spacing and capacitance. The preferred embodiment processes these capacitance changes to determine weight values.

Cable Tension Load Cells

A preferred embodiment utilizes load cells that measure cable tension developed when weight is applied to the scale platform 140. The load cells detect deflection caused by increased cable tension and convert it to weight measurements. In an example of the invention, multiple cable and load cell assemblies can be used for distributed load measurement.

Pivot Torsional Load Cells

In an embodiment of the invention, specialized load cells measure the torque force developed at the pivot point of deployable designs. The weight is supported through elastic materials or springs at the pivot, with load cells measuring their deflection. The preferred embodiment converts this torsional deflection into accurate weight values.

Parallel Beam Load Cells

In an example of the invention, parallel beam load cells are mounted between the platform and subframe. These load cells measure the deflection of parallel beams under applied weight. The preferred embodiment can utilize multiple load cells positioned strategically for optimal load distribution and measurement accuracy.

S-Type Load Cells

A preferred embodiment incorporates S-shaped load cells designed to measure both tension and compression forces. The distinctive shape allows for accurate weight measurement while maintaining a compact profile. In an embodiment of the invention, multiple S-type cells can be arranged to provide stable weight measurement across the platform surface.

In a preferred embodiment of the invention, a control system of the scale system 100 provides multiple user interface options:

Touch Screens

In an embodiment of the invention, capacitive or resistive touch screen displays are integrated into the control panel. The touch screens provide an intuitive interface for scale operation, displaying virtual buttons, weight readings, and system status. The preferred embodiment includes configurable screen layouts that can show different control options based on the current operation mode.

Buttons

A preferred embodiment incorporates physical buttons for critical functions like emergency stop, deployment, and retraction. These buttons provide tactile feedback and can be operated while wearing gloves. In an example of the invention, the buttons are backlit to indicate status and improve visibility in low light conditions.

Foot Controls ("Kick" Elements)

In an embodiment of the invention, foot-activated controls are positioned near floor level for convenient operation. These "kick" elements can include capacitive sensors or mechanical switches protected by durable covers. The preferred embodiment allows users to deploy or retract the scale through foot taps, with sensors that can detect activation through shoes.

Remote Operation Capability

In an example of the invention, the scale system 100 includes wireless connectivity for remote operation through smartphones, tablets, or dedicated remote controls. The preferred embodiment enables users to control scale functions, view weight measurements, and receive status updates from a distance using Bluetooth or WiFi communication protocols.

Wall-Mounted Controls

A preferred embodiment offers wall-mounted control panels positioned at comfortable operating height. These controls can be permanently installed or removable for handheld operation. In an embodiment of the invention, the wall-mounted controls include both essential functions and advanced features, with options for wired or wireless connection to the scale system 100.

Integrated Control Panels

In an example of the invention, control panels integrate multiple interface elements into a single unit. The preferred embodiment positions these panels on the top edge of the scale when stowed, or on vertical risers for improved accessibility. The integrated panels can combine touch screens, physical buttons, displays, and status indicators in an ergonomic layout.

In a preferred embodiment of the invention, the scale system 100 incorporates multiple safety features:

Emergency Halt Button

In an embodiment of the invention, a prominently positioned emergency stop button enables immediate cessation of scale movement. The preferred embodiment highlights this button with distinctive coloring and tactile features for quick identification. When activated, the emergency stop immediately cuts power to drive systems while maintaining control system functionality.

Free Motion Mode

A preferred embodiment includes a free motion capability that partially or fully decouples the scale platform 140 from drive system resistance. In an example of the invention, this mode activates automatically during power loss or can be manually engaged, allowing the scale platform 145 to be safely raised or lowered without powered assistance.

The power management system aspect in an exemplary embodiment enables seamless switching between battery power and hardwired AC power when available. In an embodiment, the scale system includes an AC power input and internal power supply that both operates the system and charges the batteries when connected to facility power. This dual-power capability ensures uninterrupted operation in both portable and permanently installed configurations while maintaining all automated functions and safety features. In various embodiments, the invention is powered by batteries only.

Sensors and Obstruction Detection

In an embodiment of the invention, multiple sensor types including infrared, ultrasonic, and sonar devices monitor the scale platform's 140 movement path. The preferred embodiment creates overlapping detection zones to identify objects or persons that might interfere with scale system 100 operation. When obstructions are detected, the scale system 100 prevents movement initiation or stops ongoing movement.

The audio greeting functionality in an exemplary embodiment integrates with the existing proximity detection and user recognition systems. The CPU processes user identification data from paired devices, time data from the internal clock, and platform occupancy data from the weight sensors to trigger appropriate personalized greetings. Voice synthesis parameters can be adjusted through the user interface to modify tone, volume, and other audio characteristics. The system in an embodiment stores greeting preferences and user identification data in the non-volatile memory alongside other personalization settings.

Contact Sensors

A preferred embodiment utilizes contact sensors, such as bumper switches, positioned at potential impact points on the scale assembly. In an example of the invention, these sensors immediately halt movement upon detecting contact with obstacles. The scale system 100 can be configured to automatically reverse direction or await user input following contact events.

Load Sensors

In an embodiment of the invention, load sensors monitor forces applied to the drive system 250 and mechanical components. The preferred embodiment detects excessive loading from mechanical jams or obstructions and automatically de-energizes the drive system 250 to prevent component damage.

Automatic Stop Functionality

A preferred embodiment of the scale system 100 further comprises a incorporates automated stopping features triggered by multiple conditions. In an example of the invention, the scale system 100 stops operation when detecting improper loading, movement obstruction, or reaching position limits. The automatic stop functionality can integrate inputs from multiple sensor systems to ensure safe operation under various conditions.

In a preferred embodiment of the invention, the scale system 100 provides several automated functions:

Greetings

In a preferred embodiment, the wireless device integration enables user recognition through paired smartphones or other devices, allowing the system to provide personalized voice greetings. The control system determines appropriate greetings (e.g., "Good morning" or "Good evening") based on the internal real-time clock synchronized with network time servers. When a recognized user steps onto the deployed platform, as detected by the weight sensing components, the system generates a synthesized greeting incorporating the user's name.

Timer-Based Operation

In an embodiment of the invention, the scale system 100 further comprises programmable timers controlling deployment and retraction cycles. The associated processor in an embodiment maintains a real-time clock synchronized with network time servers when available. Users can program multiple daily operation periods through the control interface, defining separate timing parameters for weekdays versus weekends. The preferred embodiment enables automatic deployment at period start times and retraction at end times, with configurable transition speeds based on time of day. The timing system includes capacitor-backed memory to maintain schedules during brief power interruptions, while a lithium battery provides backup for extended outages. The processor monitors actual usage patterns against programmed schedules and can suggest optimization of deployment windows. Warning indicators including lights and audible signals activate prior to automated movement, with timing adjustable from 5-30 seconds. Manual override controls allow users to temporarily suspend scheduled operations when needed.

Proximity-Based Deployment

In an embodiment of the invention, the scale system 100 further comprises an array of sensors enables automated deployment when users approach. The preferred embodiment utilizes multiple sensor technologies working in concert—infrared motion detection provides initial awareness from 6-10 feet, while ultrasonic ranging confirms approach direction and speed. Capacitive sensors near the scale detect final approach and verify user intent. The processor analyzes sensor data using pattern recognition algorithms to distinguish between passing traffic and purposeful approaches. Detection sensitivity automatically adjusts based on ambient light levels and historical usage patterns for the time of day. The system maintains a 3-5 second confirmation period before initiating deployment to prevent unnecessary cycling. Machine learning capabilities enable the system to recognize regular users' approach patterns and optimize deployment timing accordingly.

Idle Mode

A preferred embodiment implements progressive power management states based on inactivity duration. The light idle state activates after 2-5 minutes without interaction, dimming displays and deactivating non-essential sensors while maintaining rapid response capability. Medium idle engages after 10-30 minutes, shutting down motion control systems while keeping sensors active for quick wake-up. Deep idle represents maximum power savings, with only minimal systems powered to monitor for wake events. The processor can schedule regular idle periods aligned with facility schedules. Wake-up triggers include any control input, qualified proximity detection, scheduled events, network commands, and platform vibration sensing. The system maintains separate timing parameters for each idle state based on time of day and historical usage patterns.

Scheduled Deployment/Retraction

In an embodiment of the invention, the scale system 100 further comprises a scheduling system provides comprehensive timing control through an intuitive calendar interface. Users can define daily deployment windows with different timing for each day of the week. The preferred embodiment supports holiday schedule programming up to one year in advance, with automatic annual rollover of recurring events. The processor monitors actual usage during scheduled periods and suggests schedule refinements to improve efficiency. Integration with facility management systems enables coordination with building operations like cleaning and maintenance. The scheduling system automatically adjusts for daylight saving time changes and maintains separate schedules for different user groups or departments. Schedule conflict resolution logic prevents overlapping deployments and provides override authority levels. The system generates detailed usage reports including deployment duration, frequency of use, and schedule adherence to support ongoing optimization.

In a preferred embodiment of the invention, the scale system 100 incorporates comprehensive communication capabilities:

Internet Connectivity

In an embodiment of the invention, the scale system 100 comprises connection components to facilitate connection to local networks through both wired Ethernet and wireless protocols. The preferred embodiment utilizes secure encrypted communications to protect data transmission. The scale system 100 in an embodiment comprises components to maintain persistent cloud connectivity for real-time data synchronization while also functioning in offline mode when network access is interrupted. Connection management includes automatic failover between wired and wireless links, with configurable bandwidth usage limits and quality of service settings to prevent network congestion.

Data Storage and Trending

In the preferred embodiment the scale system 100 implements multi-tiered data storage with local flash memory for immediate access and cloud backup for long-term retention. The system records weight measurements with timestamps and user identifiers when applicable. In an example of the invention, the processor analyzes measurement trends to identify patterns and anomalies. The trending system can generate customized reports showing daily, weekly, monthly and annual statistics. Data visualization capabilities enable graphical presentation of trends through the display interface or connected devices. The storage system implements automatic data aging policies while maintaining critical historical records.

Remote Diagnostics

In an embodiment of the invention, the scale system 100 provides comprehensive remote diagnostic capabilities through a secure web interface. The preferred embodiment continuously monitors system parameters including motor current draw, sensor readings, deployment cycle counts, and internal temperature. Diagnostic data streams can be accessed in real-time or reviewed historically to identify developing issues. The system in an embodiment supports remote firmware updates and configuration changes through authenticated connections. Remote diagnostic sessions can be initiated automatically based on detected anomalies or manually by authorized service personnel.

Maintenance Monitoring

A preferred embodiment tracks usage metrics and component status to enable predictive maintenance. The scale system 100 in an embodiment comprises components to monitor deployment cycles, motor runtime, weight measurement events, and other parameters to estimate component wear. In an example of the invention, the processor compares actual performance against baseline measurements to detect degradation. The maintenance system generates proactive alerts when service is recommended based on usage thresholds or performance changes. Maintenance history and component replacement records are maintained in non-volatile storage.

Wireless Device Integration

In an embodiment of the invention, the scale system 100 comprises wireless connectivity to user devices through Bluetooth and WiFi interfaces. The preferred embodiment supports pairing with smartphones, tablets, and wearable devices for control and data access. A companion mobile application enables remote scale operation, measurement tracking, and system configuration. The wireless integration includes automatic user recognition through paired devices, allowing personalized settings and measurement tracking. The scale system 100 comprises components to synchronize data with third-party health and fitness applications while maintaining user privacy controls.

In exemplary embodiments of the invention, the scale system 100 is operated through the following methods of use:

Initial Setup and Installation

In an embodiment of the invention, the mounting base 110 is first secured to a vertical surface using provided hardware and mounting templates to ensure proper alignment. The installer connects power and any network cables, then performs an initial calibration sequence. The scale system 100 is then configured to run through automated deployment and retraction cycles to verify proper operation and sensor functionality.

In a preferred embodiment of the invention, the installation process comprises several key phases:

Site Preparation

The installation location is first evaluated to identify suitable mounting points on the vertical surface for the mounting base 110. Wall studs or structural supports are located and marked using a stud finder. The mounting area is cleared of obstacles and the surface is verified to be flat and capable of supporting the expected loads. Required power sources and network connections are identified and prepared.

Template Positioning

A mounting template in an exemplary embodiment is aligned on the wall to mark precise hole locations. The template includes multiple horizontal spacing options to accommodate standard stud spacing (16" or 24" on center) as well as non-standard configurations. A level is used to ensure proper template orientation both vertically and horizontally.

Base Frame Installation

The mounting base's 110 frame is temporarily positioned using the template marks to verify clearances. Pilot holes are drilled at marked locations using appropriate drill bit sizes for the provided mounting hardware. The mounting base's 110 frame is secured to the wall using heavy-duty lag bolts or anchors rated for the maximum expected load capacity. Each mounting point is sequentially tightened to specified torque values while maintaining frame alignment.

Component Assembly

Drive system components are attached to the mounting base according to the specific deployment design being implemented. Electrical connections are made for power, sensors, and control systems. The scale assembly is then coupled to the drive mechanism, with temporary supports used during the attachment process to prevent strain on components.

Utility Connections

Power cables are routed through provided channels or conduit and connected to the designated power source through appropriate junction boxes. Network cables, if used, are similarly routed and terminated. All connections are properly strain-relieved and protected according to local codes.

System Initialization

The scale system 100 is powered up in a controlled sequence to enable initial setup programming in accordance with an exemplary embodiment. The installer enters basic configuration parameters including deployment range limits, speed settings, sensor calibration values, network settings if applicable, time and date, and facility-specific operational parameters.

Calibration Process

A multi-step calibration procedure verifies proper operation. The scale system 100 in an embodiment performs several unloaded deployment cycles to verify smooth operation. Position sensors are calibrated at fully deployed and stowed positions. Weight measurement system is zeroed and calibrated using certified test weights. Safety systems including obstruction detection are tested and adjusted. Load sensors are calibrated to detect proper operating forces.

Final Verification

The installation in an exemplary embodiment is completed with comprehensive testing including multiple complete deployment cycles under various conditions, weight measurement accuracy verification, safety system function checks, control interface operation verification, network connectivity testing if applicable, and emergency stop and manual operation verification.

Daily Operation—Automated Mode

A preferred embodiment operates on programmed schedules or proximity detection. The scale platform 140 automatically deploys in accordance with programmed configurations as readily understood by those skilled in the art when approached by users or at scheduled times. Users step onto the deployed platform for weight measurement, with results displayed and recorded automatically. After use and a preset delay period, the scale system 100 retracts to its stowed position.

Daily Operation—Manual Mode

In an embodiment of the invention, users can manually control deployment through the control panel, foot controls, or remote devices. The user in accordance with an exemplary use initiates deployment via an actuation button or via a communicatively connected user interface, such as is displayed upon a smartphone, waits for completion, then steps onto the platform for measurement. Manual retraction can be initiated through the same control interfaces.

Multiple User Operation

The preferred embodiment supports multiple sequential users through proximity detection and weight sensing. The scale system 100 remains deployed while detecting ongoing platform use or nearby users. Between measurements, the platform automatically re-zeroes to maintain accuracy.

Maintenance Access

In an example of the invention, authorized personnel can access maintenance modes through the control interface. This enables manual positioning for cleaning, calibration, and service procedures. The scale system 100 in an embodiment provides diagnostic feedback during maintenance operations to assist with troubleshooting.

Emergency Operation

A preferred embodiment includes emergency protocols activated by the halt button or fault detection. The scale system 100 in an embodiment, following actuation of the halt button or fault detection, immediately stops movement and enters a safe state. The free-motion mode allows manual positioning if needed during power loss or system faults.

Remote Operation

In an embodiment of the invention, authorized users can operate the scale system 100 remotely through mobile devices or facility management systems. Remote functions include deployment control, weight monitoring, and system status checking while maintaining safety protocols through local sensor monitoring.

In a preferred embodiment of the invention, the scale system 100 comprises at least one control system and operates through several defined methods of use. The control system receives deployment commands through multiple interfaces including touch screens, physical buttons, foot controls, or wireless devices. Upon receiving a valid deployment command, the control system first verifies the absence of obstructions through proximity and contact sensors monitoring the scale's path of motion. If the path is clear, the drive system 250 activates to translate the scale assembly from its stowed position against the vertical surface to the deployed position.

During the deployment motion, the control system continuously monitors all safety sensors. Any detection of obstacles immediately halts movement until the obstruction is cleared and operation is manually resumed. Status indicators including lights and sounds provide feedback about system state and motion to nearby users. The scale system 100 assembly moves at a controlled rate until reaching the fully deployed position as detected by position sensors.

Once deployed, the weight sensing components activate for measurement. The platform automatically zeros itself and verifies calibration. When a user steps onto the platform, the system measures and displays the weight value. The measurement is stored in memory along with a timestamp and any associated user identification. The control system can analyze measurement trends over time and synchronize data with external health monitoring or facility management systems while maintaining user privacy controls.

After use, the control system initiates retraction either through manual command, timeout, or scheduled programming. In an exemplary embodiment, the scale system 100 further comprises a safety monitoring system remains active during retraction until the scale platform 140 reaches the fully stowed position. The control system maintains deployment and retraction cycle counts for maintenance tracking.

In accordance with an exemplary embodiment, the installation process begins with securing the mounting base 110 to the vertical surface. The installer uses provided templates to mark mounting points aligned with wall studs or structural supports. After drilling appropriate pilot holes, the mounting base 110 is attached using heavy-duty fasteners torqued to specified values while maintaining proper alignment.

The drive system 250 components mount to the mounting base 110 according to the specific deployment design being implemented. The scale system 100 assembly attaches to the drive mechanism with temporary supports preventing component strain during assembly. Power and control system wiring routes through designated channels with proper strain relief and protection.

System calibration follows a defined sequence. The installer first configures basic operational parameters including deployment limits, speed settings, and facility-specific requirements. The scale system 100 in an embodiment performs several unloaded deployment cycles to verify smooth operation while position sensors are calibrated at movement endpoints. Weight measurement calibration uses certified test weights to ensure accuracy.

Final installation verification includes comprehensive testing of all safety systems. The installer confirms proper operation of obstruction detection, emergency stops, and the free-motion mode used during power loss. Weight measurement accuracy receives final validation across the expected measurement range. Network connectivity and remote operation capabilities are verified if implemented. The scale system 100 undergoes multiple complete operational cycles under various conditions before being approved for use, all of the above in accordance with an exemplary embodiment.

In a preferred embodiment of the invention, the retractable weighing scale system 100 provides an innovative solution to the challenges of conventional weight measurement devices. The scale system's 100 vertical storage capability directly addresses the inefficient use of valuable floor and counter space in facilities like healthcare settings, residential homes, and commercial environments. When not in use, the scale platform 140 retracts against a vertical surface, eliminating permanent occupation of surface area while remaining readily accessible.

The invention's automated deployment and retraction capabilities in an exemplary embodiment, combined with comprehensive safety features, effectively mitigate tripping hazards associated with traditional floor scales. In an embodiment, the scale system 100 comprises multiple sensor systems, including proximity detection and obstruction sensing, ensure safe operation while protecting both users and equipment. The emergency stop functionality and free-motion mode provide additional safety measures for various operating conditions.

In an embodiment of the invention, the scale system's 100 retractable design significantly improves facility maintenance efficiency. The ability to quickly deploy and retract the scale platform 140 enables thorough cleaning and sanitization of surfaces without requiring temporary relocation or storage of the device. This feature is particularly valuable in healthcare settings and other environments where regular sanitization is essential.

The preferred embodiment comprises advanced control systems and multiple user interface options, enabling convenient operation through touch screens, physical controls, or remote devices. Automated functions, including proximity-based deployment and scheduled operation, enhance accessibility while maintaining efficient space utilization. The system's data collection and analysis capabilities provide valuable insights into usage patterns and maintenance needs.

Through its comprehensive design approach, the invention in embodiments transforms the traditional weight scale from a static obstacle into an intelligent, space-efficient measurement tool. The system's integration of mechanical innovation, safety features, and modern control technology effectively addresses the space utilization, safety, and maintenance challenges presented by conventional weight measurement devices while providing accurate and reliable weight measurement capabilities.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A retractable weighing scale system comprising:
   a mounting base configured for attachment to a vertical surface;

a scale assembly comprising a platform and weight sensing components;
a drive system coupling the scale assembly to the mounting base and configured to translate the scale assembly between a stowed position adjacent the vertical surface and a deployed position for weight measurement, wherein the drive system comprises:
a worm drive shaft;
at least two guide shafts positioned parallel to the worm drive shaft;
a motor mount securing a drive motor, at least one end of the worm drive shaft and at least one end of the guide shaft;
a bearing mount securing an end of the worm drive shaft; and
a scale adapter mount comprising a threaded bore engaged with the worm drive shaft; and
a control system configured to control operation of the drive system.

2. The system of claim 1, wherein the control system comprises:
proximity sensors configured to detect objects near the scale assembly;
a processor configured to prevent operation of the drive system when objects are detected; and
an emergency stop control configured to halt operation of the drive system.

3. The system of claim 1, wherein the scale assembly further comprises:
a heating element integrated within the platform and configured to warm the platform surface to a predetermined temperature when deployed;
a temperature control system configured to monitor and maintain the platform temperature; and
wherein the heating element comprises an electrical heating tape attached to an underside of the platform surface.

4. The system of claim 1, further comprising:
a removable decorative fabric cover configured to fit over the platform surface;
an attachment system configured to secure the decorative cover while maintaining weight measurement functionality; and
wherein the decorative cover comprises a material selected from the group consisting of Lycra and cotton.

5. The system of claim 1, further comprising:
an audio output system configured to provide personalized voice greetings;
a processor configured to determine appropriate greetings based on time of day and user identification; and
speakers positioned within the scale platform or mounting base to provide audio output.

6. The system of claim 1, further comprising:
a rechargeable battery system configured to power the electrical components;
a power management system configured to monitor battery charge levels and provide low battery alerts; and
an AC power input configured to operate the system and charge the rechargeable battery system when connected to facility power.

7. A retractable weighing scale system comprising:
a mounting base configured for attachment to a vertical surface, wherein:
the mounting base comprises textured attachment zones configured for attachment to the vertical surface using adhesive mounting tape; and
the adhesive mounting tape is applied in vertical strips aligned with standard wall stud spacing patterns to distribute load forces;
a scale assembly comprising a platform and weight sensing components;
a drive system coupling the scale assembly to the mounting base and configured to translate the scale assembly between a stowed position adjacent the vertical surface and a deployed position for weight measurement;
and a control system configured to control operation of the drive system.

8. The system of claim 7, wherein the drive system comprises:
a motor;
a mechanical linkage coupling the motor to the scale assembly; and
position sensors configured to detect the position of the scale assembly.

9. The system of claim 7, wherein the scale assembly comprises:
a subframe coupling the platform to the drive system;
locating components to position the platform relative to the subframe; and
support elements configured to contact a horizontal surface in the deployed position.

10. The system of claim 7, wherein the drive system comprises one selected from:
a cable and winch system;
a chain and motor system;
hydraulic actuators;
linear actuators;
a direct drive motor;
a worm gear system; and
a manual operation system.

11. The system of claim 7, wherein the weight sensing components maintain measurement accuracy after extended periods in the stowed position.

12. The system of claim 7, further comprising a removable control panel comprising:
a display screen for showing weight measurements;
control interface elements; and
mounting components configured to alternatively secure the control panel to:
a wall surface separate from the scale assembly; or
the scale assembly.

13. The system of claim 7, wherein the control system comprises:
proximity sensors configured to detect objects near the scale assembly;
a processor configured to prevent operation of the drive system when objects are detected; and
an emergency stop control configured to halt operation of the drive system.

* * * * *